United States Patent
Rennerfelt

(10) Patent No.: US 6,520,883 B1
(45) Date of Patent: Feb. 18, 2003

(54) ECCENTRIC GEAR

(76) Inventor: Gustav Rennerfelt, Nilstorpsvägen 53, S-181 47 Lidingö (SE)

( * ) Notice: Subject to any disclaimer, the term of this patent is extended or adjusted under 35 U.S.C. 154(b) by 0 days.

(21) Appl. No.: 09/869,377

(22) PCT Filed: Dec. 14, 1999

(86) PCT No.: PCT/SE99/02333
§ 371 (c)(1),
(2), (4) Date: Jun. 28, 2001

(87) PCT Pub. No.: WO00/39483
PCT Pub. Date: Jul. 6, 2000

(30) Foreign Application Priority Data

Dec. 29, 1998 (SE) ............................................. 9804578

(51) Int. Cl.⁷ ............................................. F16H 23/00
(52) U.S. Cl. ............................................. 475/163
(58) Field of Search .......................... 475/163, 164

(56) References Cited

U.S. PATENT DOCUMENTS 5,913,744 A * 6/1999 Rennerfelt ................ 475/163
5,964,676 A * 10/1999 Rennerfelt ................ 475/163

FOREIGN PATENT DOCUMENTS

| WO | WO 95/00815 | 1/1995 |
| WO | WO 96/05451 | 2/1996 |
| WO | WO 96/17187 | 6/1996 |
| WO | WO 97/26467 | 7/1997 |

* cited by examiner

*Primary Examiner*—Dirk Wright
(74) *Attorney, Agent, or Firm*—Young & Thompson

(57) ABSTRACT

An eccentric gear for transferring a torque in one single step and at a high gear ratio, from a driving element to a driven element. In a stationary housing there is an outer gear ring which co-operates with an inner gear ring which in turn is co-rotatively connected to the driven element that is mounted in bearings via a stationary bearing. The inner gear ring is eccentrically movable to generate along the outer gear ring, while only some teeth are in engagement with the outer gear ring. Thereby, the inner gear ring, which performs a nutating motion, is connected to a thin rod which at a free end has a male element that is in engagement with a seat formed with an analogous cross-sectional shape located deeply within the driven element. By this construction, the gear attains an extremely short length of construction, at the same time as the sound level during operation is reduced.

11 Claims, 4 Drawing Sheets

Figure 1:
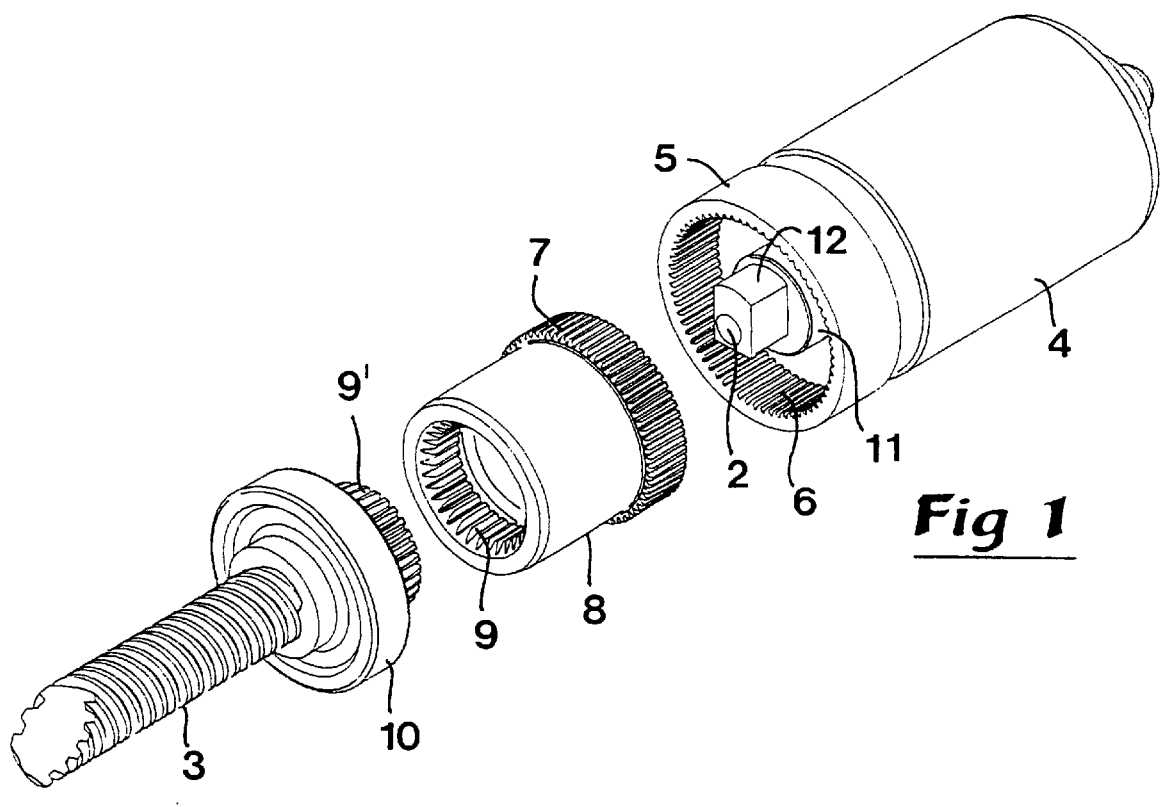

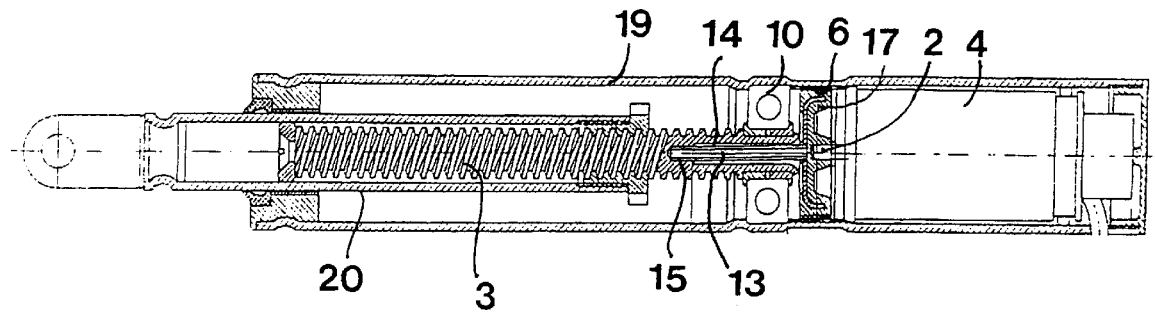
*Fig 8*
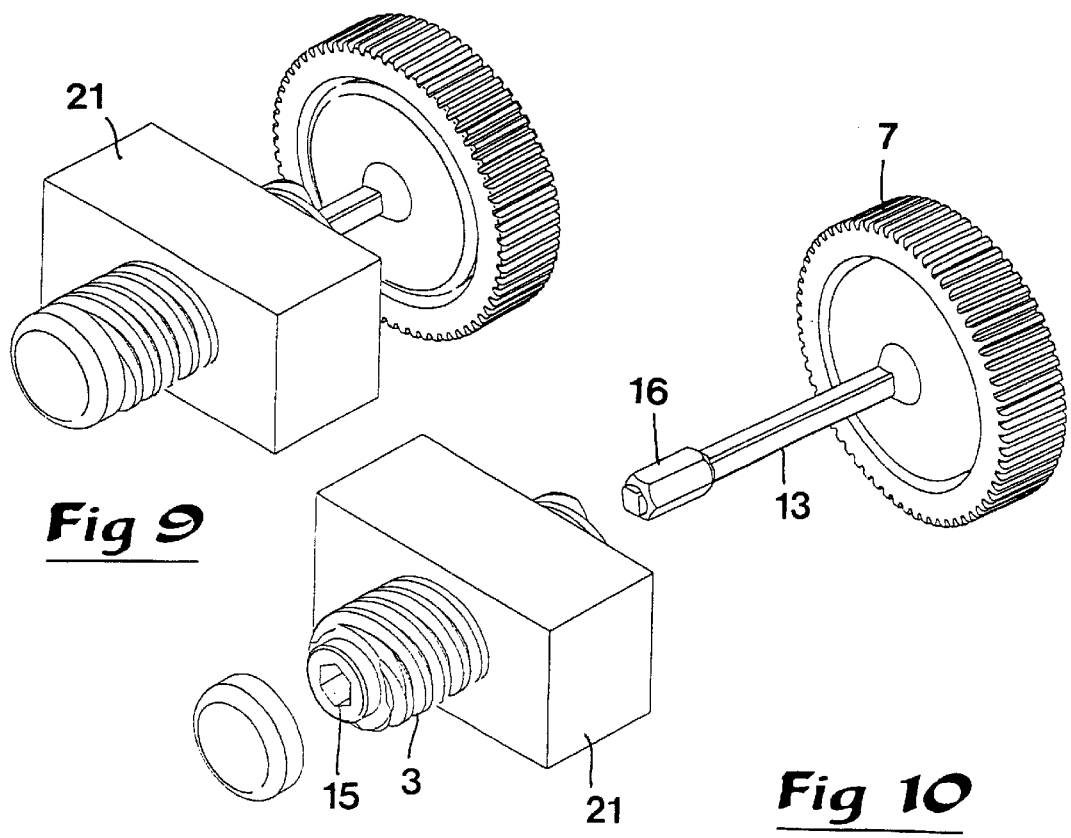
*Fig 9*
*Fig 10*

ECCENTRIC GEAR

TECHNICAL FIELD OF THE INVENTION

This invention relates to an eccentric gear for transferring a torque or a force between rotatable elements, one of which is driving and another is driven, comprising two co-operating gear rings with differently large pitch diameters, of which a first, outer ring of a largest diameter has a certain number of inwardly directed teeth, and a second, inner ring has a smaller number of outwardly directed teeth, of which a certain number engage with the outer gear ring by the fact that the inner gear ring is eccentrically movable and rollable relative to the outer, more specifically by the fact that the inner gear ring is connected to an elongated body, whose geometrical axis of rotation is oblique relative to a geometrical axis of symmetry through the center of the outer gear ring and which during the generation of the inner gear ring against the outer gear ring is submitted to a nutating motion, during which the axis of rotation of the body moves as a generatrice along the envelope surface of an imaginary cone, viz. around a nutation point that is axially distanced from the gear rings, said body being, in a region that is substantially equally distanced from the gear rings as the nutation point, co-rotatively connected to the driven element, and the gear change between said elements being dependent on the total number of teeth in the respective gear rings.

PRIOR ART

An eccentric gear of the type described above has been previously disclosed in WO 96/05451, which claims priority from SE 9402701-8. A general advantage with eccentric gears of this type is that they in one single step make possible large gear changes. A special advantage with the specific eccentric gear disclosed in WO 96/05451, is that it does not need any own output shaft in bearings, but may utilize the own bearing of the driving element. Then, the driven element is provided with the one half of an arch-tooth coupling, whose other half is included in an elongated body that carries the inner gear ring. This arch-tooth coupling eliminates the risk of either the gear or the driven element being loaded with dangerous breaking loads in bearings; something that guarantees that the adjustment of the gear relative to the driven element does not become critical.

However, the embodiments exemplified in said document are of such a nature that they shall be capable of transferring comparatively large torques to the driven element. Due to this reason, the elongated body that carries the inner gear ring has a comparatively large moment of inertia by being strongly constructed. Thus, according to a major number of embodiments, the body is tubular and made of massive metal. Therefore, the known embodiments have turned out to be less appropriate for such practical applications, where the requirements of high torques are moderate, but the requirements of a short length of construction, constructive simplicity and a silent operation are the larger.

OBJECTS AND CHARACTERISTICS OF THE INVENTION

The present invention aims at removing the above-mentioned shortcomings of previously known eccentric gears and creating an improved eccentric gear. Thus, a primary object is to create an eccentric gear with a minimal length of construction. Another object is to create an eccentric gear of a low sound level. Still another object is to provide an eccentric gear of a simple mechanical construction, which may be manufactured in a rational and cost-effective way.

According to the invention, at least the primary object is achieved by the characteristics that are defined in the characterizing clause of claim 1. Preferred embodiments of the invention are further defined in the dependent claims.

FURTHER ELUCIDATION OF WO 96/05451

In FIG. 8 of the above-mentioned WO 96/05451, an embodiment is exemplified that comprises a central axle journal which at one end is co-rotatively connected to a sleeve-shaped part of a gear-ring-carrying body, and at the other end is connected to a wheel with a toothing for engagement with a cable or chain. However, in this case the journal is not introduced into any elongated hole in the driven element, nor is it co-rotatively connected to it at a point situated deeply within the driven element.

BRIEF DESCRIPTION OF THE APPENDED DRAWINGS

Figure 2:
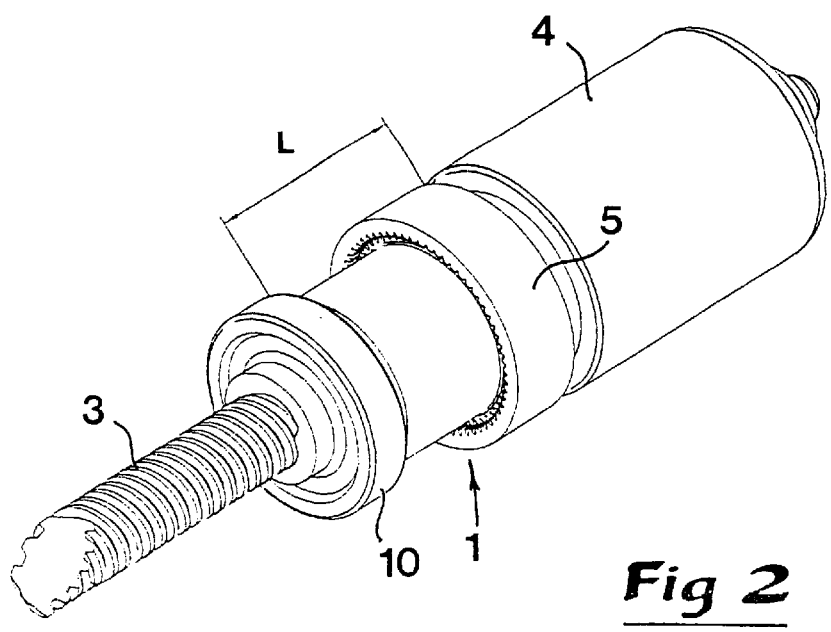
Figure 3:
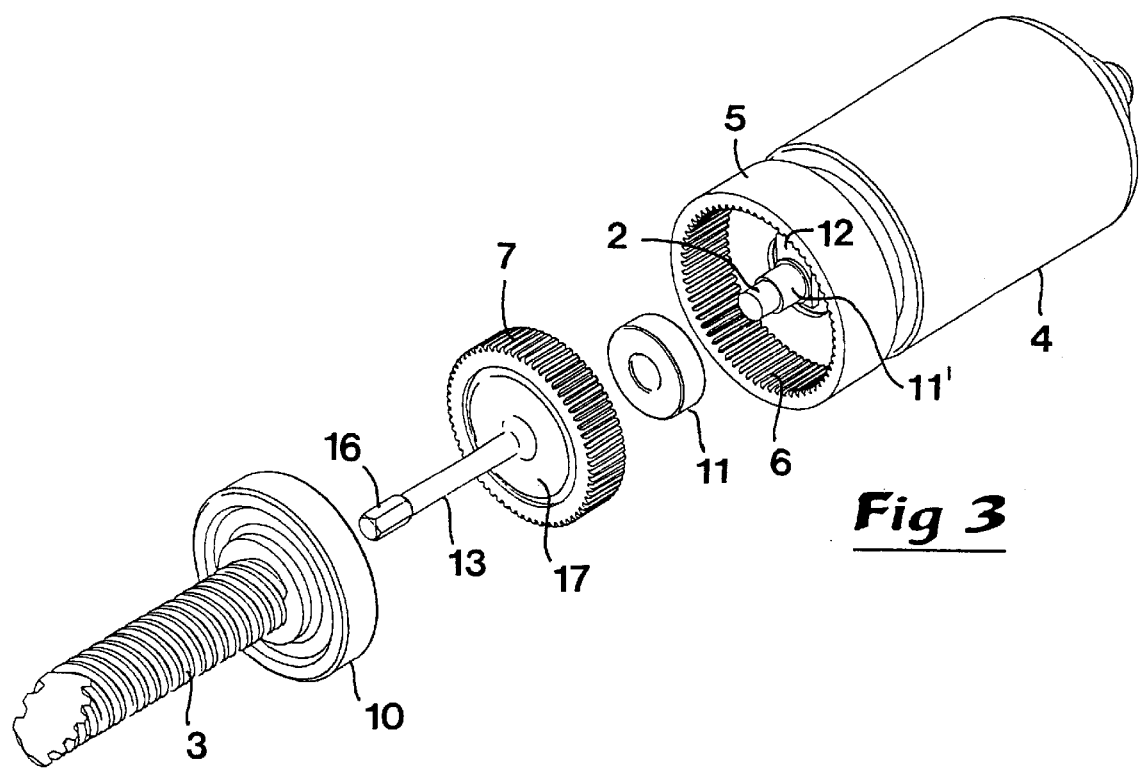
Figure 4:
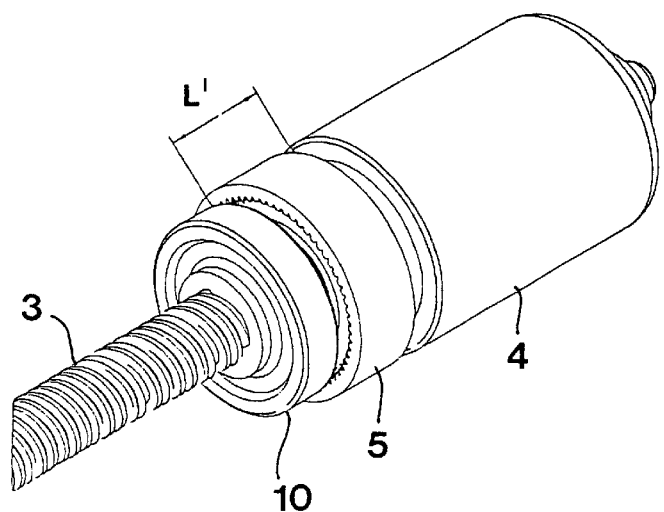
Figure 5:
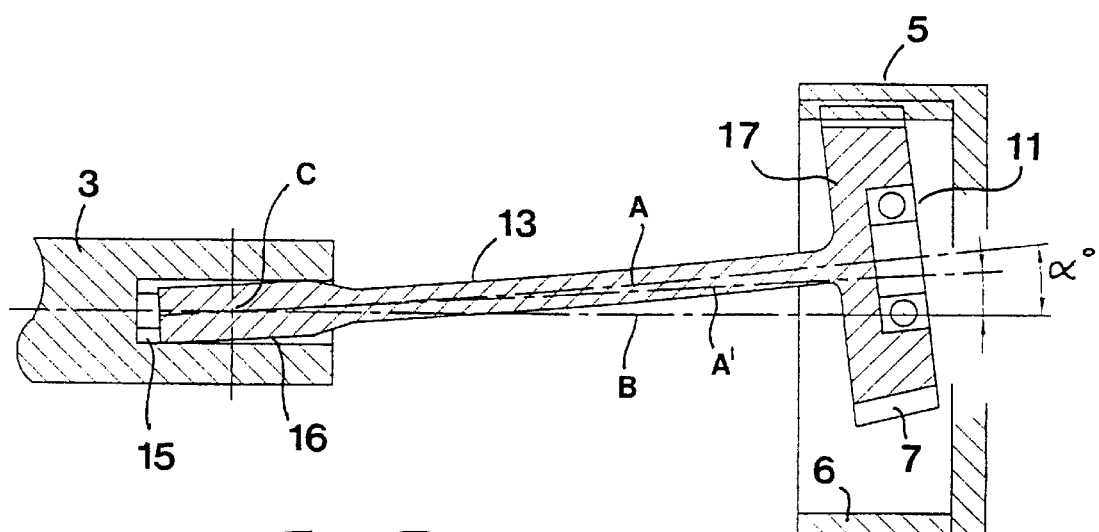
Figure 6:
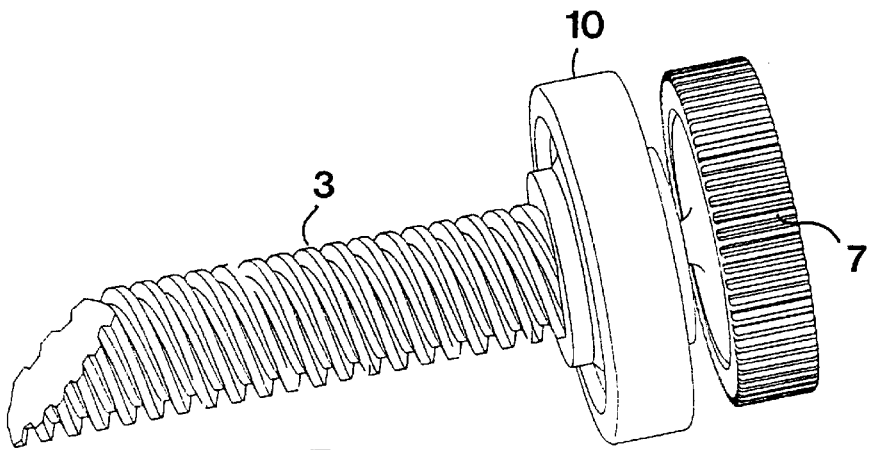
Figure 7:
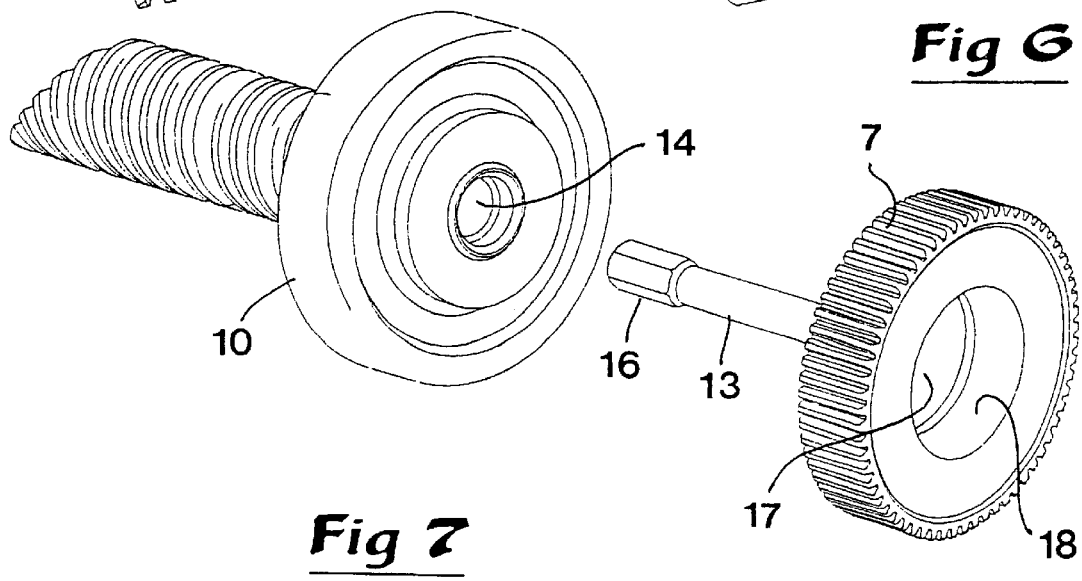

In the drawings:

FIG. 1 is a perspective exploded view showing vital details of a known eccentric gear disclosed in WO 96/05451, FIG. 2 is a perspective view of the same details in an assembled state, FIG. 3 is a perspective exploded view corresponding to FIG. 1, showing an embodiment of an eccentric gear according to the present invention, FIG. 4 is a perspective view of the details shown in FIG. 3 in an assembled state, FIG. 5 is a schematic longitudinal section that, by exaggerated geometry, illustrates the fundamental nutation principle that is applied in the gear according to the invention, FIG. 6 is a partial perspective view showing an inner gear ring connected to a driven element in the form of a screw, FIG. 7 is a perspective exploded view showing the same details in a separated state, FIG. 8 is a longitudinal section through an adjustment device, in which is comprised an eccentric gear according to the invention, FIG. 9 is a perspective view illustrating an alternative embodiment of the invention, and FIG. 10 is a perspective exploded view showing separated details included in the gear according to FIG. 9.

FURTHER ELUCIDATION OF PRIOR ART

In FIGS. 1 and 2, an eccentric gear is shown that has been previously disclosed in WO 96/05451. A first rotatable element is hinted at 2, and a second rotatable element is designated 3. In the shown example, the element 2 is driving, while the element 3 is driven, more specifically via the gear 1. In the example, the element 2 constitutes a part of an output shaft of a motor 4, e.g., an electric motor. The second element 3 is exemplified by a screw that may be included in an arbitrary application object, e.g., an adjustment device according to FIG. 8.

A component in the gear is constituted by a housing in the form of a ring 5 that is stationarily mounted, i.e., standing still, together with the motor 4. On its inside, this ring has a first, external gear ring 6 that comprises a certain number of inwardly directed teeth. In practice, the gear ring may be cylinder-shaped, i.e., the individual teeth are elongated and extend parallel to the symmetry axis of the ring 5 (which axis coincides with the geometrical rotation axis of the output driving shaft). With the gear ring 6 co-operates a second gear ring 7 which comprises a smaller amount of outwardly directed, individual teeth, of which only a few engage with the outer gear ring 6. The inner gear ring 7, which hereinafter in the description is denominated eccentric gear ring, is in practice slightly conical and converges in the direction of the motor. The eccentric gear ring 7 is connected or integrated with an elongated body 8, that is substantially tubular. At the end that is opposed to the eccentric gear ring 7, the body 8 has one half 9 of an arch-tooth coupling, whose other half 9' is co-rotatively connected to the screw 3. The teeth to the first half 9 of the arch-tooth coupling are internally placed in the tubular body 8, while the teeth in the other half 9' of the coupling are externally placed on a hub part. The screw 3 is mounted in a stationary bearing 10 in the form of a thrust bearing, e.g., an axial ball bearing.

The two gear rings 6, 7 have differently large pitch diameters. More specifically, the outer gear ring 6 has a larger diameter than the eccentric gear ring 7, the latter comprising fewer teeth than the gear ring 6. For instance, the outer gear ring 6 may comprise 90 teeth, while the eccentric gear ring 7 comprises 89 teeth (whereby the gear ratio becomes 89:1). In a way that is described in detail in WO 96/05451, the tubular body 8 is submitted to a nutating motion around a nutation point located in the region of the arch-tooth coupling 9, 9',when it is driven by means of a ball bearing 11 that co-operates with an eccentric body (not visible), which is carried by the output shaft 2. 12 designates a balance weight that counterbalances the eccentric body.

As may be seen in FIG. 2, the total length of construction L of the gear 1 is not only determined by the width of the stationary ring 5, but also by the axial length of the part of the tubular body 8 that extends between the eccentric gear ring 7 and the opposed end surface of the tubular body. In practice, the length of the tubular body 8 is larger than the width of the ring 5. For instance, the total length of construction L may amount to 44 mm, the width of the ring 5 being about 17 mm.

Gear rings in general have geometrical errors in the form of tooth-to-tooth errors and ovality. When oval gear rings are used in eccentric gears of the type in question, a "beating" noise arises that depends on the fact that the eccentric gear ring has difficulties in following the ovalities that influence its rotation axis by being momentarily forced to accelerate and retard. For this reason, it is important that the eccentric gear ring and the appurtenant carrying body have a polar moment of inertia as low as possible.

In FIG. 1, it should be noted that the tubular body is of a relatively strong design, and that is the reason why it, in practice, has a considerable moment of inertia. If one assumes that the arch-tooth coupling is infinitely stiff and gap-free, then the total, polar moment of inertia of the eccentric gear ring and the tubular body will include also the polar moment of inertia of the driven element, which thereby becomes very large. In order to reduce this moment of inertia, the torsional stiffness of the arch-tooth coupling may of course be diminished, e.g., by reducing the stiffness in the teeth or by introducing any type of elastic coupling. However, the drawback still is that the eccentric gear ring and the tubular body per se have a relatively large moment of inertia.

DETAILED DESCRIPTION OF PREFERRED EMBODIMENTS OF THE INVENTION

Reference is now made to the other drawing figures that illustrate an eccentric gear according to the present invention. In FIGS. 3 to 10, homologous details have the same reference numerals as in FIGS. 1 and 2.

According to the invention, the elongated body that carries the eccentric gear ring 7 has the shape, in relation to the diameter of the eccentric gear ring, of a thin rod 13 that is introduced into a larger, long hole in the driven element 3. This hole may be best seen in FIG. 8, where it is designated 14. At a free end distal from the eccentric gear ring, this rod 12 is co-rotatively connected to the driven element at a point located deeply within the hole. According to the embodiment of FIG. 8, it is shown how the free end of the rod is introduced in a seat 15 in the region of a bottom of the hole 14, the hole 14 per se being larger than the seat 15.

According to the preferred embodiment exemplified in FIG. 3, the rod is connected to the driven element mechanically, more specifically by means of a male means 16 of-oval cross-sectional shape provided at the free end of the rod, which means engages in a seat located deeply in the driven element, said seat having an analogous oval cross-sectional shape. In the example according to FIG. 3, the male means 16 (together with the seat) has a polygonal, more specifically, a hexagonal cross-sectional form. The male means may have the shape of a head that is larger than the remainder of rod 13.

In practice, the diameter of rod 13 may amount to maximally 20%, suitably maximally 15%, and minimally 4%, suitably minimally 6%, of the diameter of the eccentric gear ring 7. In practice, the length of the rod should be at least equally large as the diameter of the eccentric gear ring 7.

According to the shown embodiments, the eccentric gear ring 7 is provided along the periphery of a plate-shaped body 17, from which the rod protrudes centrically and perpendicularly to the plane of the body, more specifically at the one side of the body. As may be seen in FIG. 7, the plate body 17 as such may have a thickness that is smaller than the width or the axial extension of the eccentric gear ring 7, whereby a central space 18 is delimited inside the eccentric gear ring. In this space 18, an eccentrically movable ball bearing 11 may be accomodated. In a way known per se, the bearing 11 is provided on an eccenter body 11' on the output shaft 2 of the motor 4.

Reference is now made to FIG. 5, which schematically illustrates the nutation principle that is applied on the gear according to the invention. It should be pointed out straight away that this picture, for the sake of clarity, is distorted in that on one hand the driven element 3 is shown at large distance from the housing or ring 5 (in reality, the end of the element 3 is located in the immediate proximity of the housing), and on the other hand the obliquity angle of the rod 13 is excessively large. The rod 13 has a geometrical axis of symmetry designated A that is generally oblique relative to a fictive geometrical axis of symmetry B through the center of the outer gear ring 6. The axis of symmetry A is shown in a state where the rod is bent out by being introduced in the seat 15 with at least a slight press fit. In a theoretically feasible, unloaded state, the axis of symmetry designated A' should be straight and-less angled relative to the axis of symmetry B. The angle α between the axes of symmetry A, B may vary, but should lie within the range 0,2 to 2,0, suitably 0,3 to 0,8°. When the gear ring 7 is set into motion by means of the bearing 11 that is eccentrically movable relative to the axis B, the gear ring 7 generates against the outer gear ring 6, whereby the rod is submitted to a nutating or wobbling motion, during which its axis of symmetry A moves as a generatrice along the surface of an imaginary cone, more specifically around a nutation point designated C, that is axially distanced by a considerable distance from the gear rings 6, 7. By having a low resistance to bending, the rod may thereby be bent out in the above-mentioned way. In practice, at least the eccentric gear ring 7 may have a conical basic shape with small ends and large ends. One can assume that the outer gear ring 6 comprises 100 teeth, while the eccentric gear ring 7 comprises 99 teeth, of which only a few (e.g., 5 to 8) are in engagement with the outer gear ring 6. For the driven element 3 to turn around by 1 revolution, the eccentric gear ring 7 then must generate by 99 revolutions along the outer gear ring 6 (whereby the driving shaft rotates 99 revolutions). In other words, a gear ratio of 99:1 is achieved.

In FIG. 8 an embodiment is illustrated, according to which the invention is applied in a linear adjustment device that is intended for a fully automatic large scale production. The device comprises an outer tube or sleeve 19. Within the outer tube 19 is provided a second piston-rod-like tube 20, which at an inner end is in thread engagement with the screw 3. The axial ball bearing 10 is fixed by plastic deformation of the tube. Moreover, the outer gear ring 6 is provided directly in the tube 19, more specifically by plastic deformation of the latter. It should be evident that the motor 4 is fixed within the tube, the screw 3 being rotatable, but axially immobile relative to the tube 19. However, by the thread engagement between the screw and the secondary tube 20, the latter may be moved axially reciprocally relative to the outer tube 19.

When the eccentric gear according to the invention is used in such an adjustment device, then the eccentric gear ring 7 may be made of injection-moulded plastic or some other semi-rigid, albeit flexible material. Then the eccentric gear ring and the appurtenant plate body 17 may be made in one piece with the rod 13, i.e., also the rod consists of plastic or some other semi-rigid, albeit flexible material, whereby the rod obtains a low resistance to bending. The rod may also be made of metal or some other material that confers to the rod a larger stiffness and resistance to bending, in order to fit to applications for which the requirements of torsional stiffness are higher. However, also in this case the rod may be axially bendable. Notwithstanding which material that is comprised in the rod 13 as such, the male means or hexagon head 16 may advantageously consist of plastic or some other semi-rigid, albeit flexible material.

The male means or hexagon head 16 at the free end of the bar 13 is centered relative to the nutation point C (i.e., the axial center of the head is located about in the nutation point C). Also the seat with the corresponding shape is centered relative to the nutation point.

The fitting between the head and the seat may either consist of a slight press fit or have a certain play. In the former case, the rod 13 will be bent out to permit the eccentric motion of the eccentric gear ring during the generation against the outer gear ring 6. In other words, in this case the rod must have a relatively low resistance to bending; something that per se implies that also the torsional resistance in it becomes limited.

In the case of a certain play, the play permits a larger obliquity of the rod. The flexural stiffness as well as the torsional stiffness of the rod may therefore be larger; something that makes possible a larger stiffness in the transfer of torque to the driven element, i.e., the screw 3. However, by a suitable choice of play it is also feasible to attain a certain bending of the rod, and thereby, a freedom of play between the hexagon head and the hexagonal seat. This is important from a sound aspect, in that the freedom of play effectively counter-acts the arising of noise.

The term "rod" as used in the description and the appended claims, should be interpreted in its widest sense. Instead of genuine round rods of massive material, also tubes may be used, and in all cases the cross-sectional shape may deviate quite considerably from the circle-round. Thus, the rod may also have a polygonal cross-section. Further is it feasible to form the rod without a thickened head. For instance, a cross-sectionally polygonal rod may be introduced with its free end into an equally cross-sectionally polygonal seat in the bottom of a larger hole. The male means may even be smaller than the rest of the rod. It is also feasible to connect the rod to the seat in another way than by a mechanical engagement. Thus, the free end may be glued on to the seat.

An important advantage of the invention is that the length of construction of the eccentric gear may be considerably reduced. By the fact that the thin rod is introduced into an equally thin hole in the driven element and co-rotatively connected to this element at a point deeply countersunk in the element, the driven element and the appurtenant thrust bearing may be located considerably closer to the driven element than in the construction according to WO 96/05451. Thus, as may be seen in FIG. 4, the thrust bearing 10 may be separated from the motor 4 substantially only via the gear ring 5, whereby the length of construction L' of the gear is almost halved in relation to the length of construction L in the embodiment according to FIG. 2, where the tube body 8 requires a considerable axial space.

In FIGS. 9 and 10, an embodiment is schematically illustrated, according to which the screw 3 is not only rotatable but also axially movable. In this case, the screw is in engagement with an internal thread (not visible) in a block 21 (or any other arbitrary component), the hole within the screw along its entire length, or a large part thereof, having a polygonal or other cross-sectional shape corresponding to the cross-section of the head of the rod or male means 16. By restricting the axial motion capability of the gear ring 7 in a suitable way, the head 16 will substantially permanently be located in the previously mentioned nutation point, while the screw during its rotation moves in either of two opposing axial directions.

By forming the eccentric gear wheel with a comparatively thin rod according to the invention, a radical reduction of the mass of the component, and thereby of its moment of inertia, is attained. Therefore, the gear wheel can easily follow the tooth errors that occur, which leads to a more silent operation. In order to further decrease the sound level, the depth of the tooth gaps between the teeth may be altered; something that is particularly easy to make when the gear wheel is to be made of plastic. Here, a longer tooth may be attained, which bends out more for a given load, whereby each individual tooth becomes more flexible relative to the outer gear ring. It is also possible to camber the teeth in order to obtain a silent operation by the fact that edge abutment is then avoided.

Besides a reduced length of construction and silent operation, the gear construction according to the invention also involves the advantage that the requirements of straightening in connection with the mounting become moderate. Moreover, a simple driving of a screw threaded into a block is made possible in connection with large scale production.

FEASIBLE MODIFICATIONS OF THE INVENTION

The invention is not restricted solely to the embodiments as described above and shown in the drawings. Thus, the gear according to the invention may be used for the transfer of torque from any driving, rotatable element to any arbitrary, driven element in which an elongated hole may be recessed. Although the hole in the driven element in the examples has been shown with a substantially uniformly large, cylindrical shape, it is also feasible to give the hole another shape, e.g., tapering in the direction of the seat for the male means.

What is claimed is:

1. An eccentric gear for transferring a torque or a force between rotatable elements (2, 3), one of which is driving (2) and another is driven (3), comprising two co-operating gear rings (6, 7) with differently large pitch diameters, of which a first, outer ring (6) of a largest diameter has a certain number of inwardly directed teeth, and a second, inner ring (7) has a smaller number of outwardly directed teeth, of which only some engage with the outer gear ring (6), the inner gear ring (7) being eccentrically movable and rollable relative to the outer (6), the inner gear ring being connected to an elongated body, whose geometrical axis of rotation (A) is oblique relative to a geometrical axis of symmetry (B) through the center of the outer gear ring (6) and which during the generation of the inner gear ring against the outer gear ring is subjected to a nutating motion, during which the axis of rotation of the body moves as a generatrice along the envelope surface of an imaginary cone, around a nutation point (C) that is axially distanced from the gear rings (6, 7), said body being, in a region that is substantially equally distanced from the gear rings as the nutation point, co-rotatively connected to the driven element (3), and the gear change between said elements being dependent on the total number of teeth in the respective gear rings, the elongated body being a rod (13) which is introduced into a larger, long hole (14) in the driven element (3) and which in the region of a free end that is distal from the inner gear ring, is co-rotatively connected to the driven element (3) at a point (15) located within the hole (14).

2. Eccentric gear according to claim 1, wherein the rod (13) is mechanically connected to the driven element (3) by means of a male means (16) with a non-circular cross-sectional shape provided at the free end of the rod, which male means engages into a seat (15) formed in the hole with a non-circular cross-sectional shape.

3. Eccentric gear according to claim 2, wherein the male means consists of a head (16) that is larger than the rest of the rod (13).

4. Eccentric gear according to claim 1, wherein the diameter of the rod (13) amounts to maximally 20% and minimally 4% of the diameter of the inner gear ring (7).

5. Eccentric gear according to claim 1, wherein the inner gear ring (7) is arranged along the periphery of a plate-shaped body (17), from whose one side the rod protrudes perpendicularly to the plane of the body.

6. Eccentric gear according to claim 5, wherein the inner gear ring (7) and at least parts of the appurtenant plate body (17) consist of a semi-rigid material.

7. Eccentric gear according to claim 1, wherein the rod (13) consists of a semi-rigid material.

8. Eccentric gear according to claim 3, wherein the head (16) consists of a semi-rigid material.

9. Eccentric gear according to claim 6, wherein the rod (13), the head (16) and the plate body (17) with the appurtenant inner gear ring (7) are made in one single piece of a semi-rigid material.

10. Eccentric gear according to claim 5, wherein the width of the inner gear ring (7) is larger than the thickness of the plate body (17), in order to delimit a space (18) on that side of the plate body that is opposed to the rod (13), said space containing a bearing (11) that is eccentrically located relative to the axis of rotation (2) of the driving element.

11. Eccentric gear according to claim 2, wherein the width of the inner gear ring (7) is larger than the thickness of the plate body (17), in order to delimit a space (18) on that side of the plate body that is opposed to the rod (13), said space being for a bearing (11) that is eccentrically located relative to the axis of rotation (2) of the driving element.

* * * * *